(12) United States Patent
Ogawa et al.

(10) Patent No.: US 8,485,593 B2
(45) Date of Patent: Jul. 16, 2013

(54) DRAIN PLUG

(75) Inventors: Atsushi Ogawa, Kanagawa (JP); Tomoki Yamaguchi, Saitama (JP); Hajime Saito, Saitama (JP); Toshiya Ohba, Saitama (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 236 days.

(21) Appl. No.: 12/923,748

(22) Filed: Oct. 6, 2010

(65) Prior Publication Data

US 2011/0084519 A1 Apr. 14, 2011

(30) Foreign Application Priority Data

Oct. 9, 2009 (JP) ............................. P. 2009-235036

(51) Int. Cl.
*B65D 39/04* (2006.01)

(52) U.S. Cl.
USPC .......................................... 296/208; 296/154

(58) Field of Classification Search
USPC ................... 220/676, 780, 784, 785, DIG. 6, 220/DIG. 19; 296/154, 208
See application file for complete search history.

(56) References Cited

U.S. PATENT DOCUMENTS

| 2,821,429 | A | * | 1/1958 | Rantala | 296/208 |
| 3,382,889 | A | * | 5/1968 | Heinz et al. | 137/855 |
| 4,658,979 | A | * | 4/1987 | Mietz et al. | 220/203.13 |
| 4,930,659 | A | * | 6/1990 | Sauber | 220/787 |
| 4,953,742 | A | * | 9/1990 | Kraus | 220/787 |
| 5,660,302 | A | * | 8/1997 | Trout | 220/790 |
| 5,709,309 | A | * | 1/1998 | Gallagher et al. | 220/229 |
| 6,450,563 | B2 | * | 9/2002 | Yee | 296/154 |
| 6,682,126 | B2 | * | 1/2004 | Kanie | 296/152 |
| 7,108,269 | B2 | * | 9/2006 | Benkel et al. | 277/606 |

FOREIGN PATENT DOCUMENTS

| JP | 58214477 | A | * | 12/1983 |
| JP | 60045479 | A | * | 3/1985 |
| JP | 60045481 | A | * | 3/1985 |
| JP | 60045482 | A | * | 3/1985 |
| JP | 61-226375 | A | | 10/1986 |
| JP | 61226375 | A | * | 10/1986 |
| JP | 62083252 | A | * | 4/1987 |
| JP | 62227880 | A | * | 10/1987 |
| JP | 2008126691 | A | * | 6/2008 |

* cited by examiner

*Primary Examiner* — Glenn Dayoan
*Assistant Examiner* — Paul Chenevert
(74) *Attorney, Agent, or Firm* — McGinn IP Law Group, PLLC

(57) ABSTRACT

A drain plug includes a head part arranged on a peripheral edge of a drain hole from a front side, and an engaging leg engaged with the peripheral edge of the drain hole from a back side. The engaging leg includes a frame wall extending in a direction in which a space between a pair of panels forming a body panel is widened; an opening part facing the a connecting part of the pair of panels of the body panel; engaging parts formed on both side walls of the frame wall, to be engaged with the peripheral edge of the drain hole from the back side; and a guide surface formed on a front wall of the frame wall, to guide the engaging parts to pass through the drain hole.

15 Claims, 6 Drawing Sheets

DRAIN PLUG

CROSS-REFERENCE TO RELATED APPLICATION(S)

This application claims priority from Japanese Patent Application No. 2009-235036 filed on Oct. 9, 2009, the entire contents of which are incorporated herein by reference.

BACKGROUND

1. Field of the Invention

An aspect of the present invention relates to a drain plug for draining water accumulated in a body panel of a motor vehicle.

2. Description of the Related Art

For example, a body panel (such as a trunk lid, a door, a fender and the like) of a motor vehicle is formed of an outside panel and an inside panel. For example, the end part of the outside panel and the end part of the inside panel are connected together, and a space defined between the panels is suitably widened to thereby form the body panel having a prescribed thickness. In such body panel, rain water or washing water during a cleaning work of a vehicle body may occasionally enter and may be possibly accumulated. Accordingly, a hole for draining water is formed in the body panel to drain outside the water in the body panel from the hole.

However, under a state that such a drain hole is opened, there is a fear that smell of fuel, muddy water, dust and noise may enter the vehicle body. Accordingly, a plug is attached so as to close the drain hole and permit water to be drained from the drain hole.

For example, JP-S61-226375-A discloses a drain plug including a flange head part (non-insert part) and an insert part connected to the head part. The insert part is to be inserted into a drain hole. The cylindrical-shaped insert part protrudes with a prescribed height from the back side of the head part, and a part of the insert part is cut out along the peripheral direction to form a sector-shaped cut-out groove. Along an outer periphery of the insert part at an end part, an engaging pawl is formed to radially protrude with a prescribed height. When the insert part is inserted into the drain hole formed in a body panel, the head part is engaged with the drain hole from a front side, while the engaging pawl on the insert part is engaged with the drain hole from a back side, thereby attaching the plug to the drain hole.

In the body panel formed of a pair of panels defining a prescribed space therebetween, for example, one panel may be bent to come close to the other panel or both the panels may be bent to come close to each other so as to reduce the space toward a connecting part of the panels. In this case, water entering the body panel will be guided to and accumulated in the connecting part of the panels, due to its tare weight. Therefore, it is preferably to provide the drain hole around the connecting part of the panels.

In JP-S61-226375-A, the insert part of the plug is formed in the cylindrical shape protruding with the prescribed height. In this case, when the drain hole is provided at a position where the space between the panels is reduced, it is difficult to ensure a sufficient insert stroke for inserting the insert part, and the plug cannot be attached to the drain hole. Since the space between the panels is extremely narrow in an end edge part as in a trunk lid, for example, the drain hole cannot be provided closely to the end edge part.

SUMMARY

One object of the present invention to provide a drain plug applicable to a drain hole formed around the connecting part of a body panel so as to sufficiently drain water.

According to an aspect of the present invention, there is provided a drain plug fitted to a drain hole formed in a body panel at an end edge part thereof, the body panel being formed of a pair of outside and inside panels, a space between the pair of panels being widened toward a prescribed direction from the end edge part, the drain plug including: a head part arranged on a peripheral edge of the drain hole from a front side, so as to cover the drain hole; and an engaging leg formed on a back surface of the head part, so as to be engaged with the peripheral edge of the drain hole from a back side by being inserted thereinto, wherein the engaging leg includes: a frame wall formed of a front wall and both side walls, so as to be extended in the prescribed direction while being separated from the head part; an opening part provided in a rear part of the frame wall, so as to face the end edge part of the body panel; engaging parts formed on both the side walls, so as to be engaged with the peripheral edge of the drain hole from the back side; and a guide surface formed on the front wall facing the head part, so as to guide the engaging parts to pass through the drain hole.

The head part may include: a thick part having a first thickness; a thin flange part having a second thickness smaller than the first thickness and extending from a peripheral edge of the thick part, so as to elastically abut on the peripheral edge of the drain hole from the front side; and pressing protrusions formed on a back surface of the thick part at positions facing to the engaging parts on the engaging leg, so as to abut on the peripheral edge of the drain hole from the front side.

The pressing protrusions may be formed into ribs extending in a direction perpendicular to the prescribed direction.

A rib or a recess may be formed on a back surface of the thin flange part at an opposite side to the frame wall, so as to form a gap for draining water between the peripheral edge of the drain hole and the thin flange part.

According to the present invention, when the end part of the frame wall of the engaging leg is inserted into the drain hole to obliquely insert the engaging leg along the guide surface, the engaging parts of both the side walls are engaged with the peripheral edge of the drain hole from the back side, and the head part abuts on the peripheral edge of the drain hole from the front side to sandwich the peripheral edge of the drain hole between the engaging leg and the head part, so that the drain plug can be attached to the drain hole.

At this time, since the end part of the frame wall is obliquely extended to the direction in which the space between the pair of panels is widened from the end edge part of the body panel and separating from the head part, the engaging leg can be obliquely inserted into the drain hole, and even when the drain hole is provided around the end edge part of the body panel and the space between the pair of panels is narrow, the drain plug can be attached to the drain hole. As a result, the drain hole can be formed more closely to the connecting part of the pair of panels of the body panel, and water can be sufficiently drained from the opening part on the rear part of the frame wall facing the end edge part of the body panel.

Since the engaging leg includes the front wall and both the side walls, for example, even when the drain plug is formed with an elastic material such as rubber or elastomer, a sufficient rigidity can be ensured. Further, even when water enters inside the engaging leg, the water is drained through the opening part formed in the frame wall, and can be prevented from being accumulated inside the engaging leg.

DRAWINGS

FIG. 1A is a perspective view, and FIG. 1B is a perspective view when the drain plug shown in FIG. 1A is viewed from an opposite side.

FIG. 2A is a bottom view, and FIG. 2B is a side view.

FIG. 3A is a sectional view taken along a line A-A in FIG. 2A, and FIG. 3B is a sectional view taken along a line B-B in FIG. 2A.

DETAILED DESCRIPTION

Next, referring to FIGS. 1A to 5, one embodiment of a drain plug will be described below.

Figure 4:
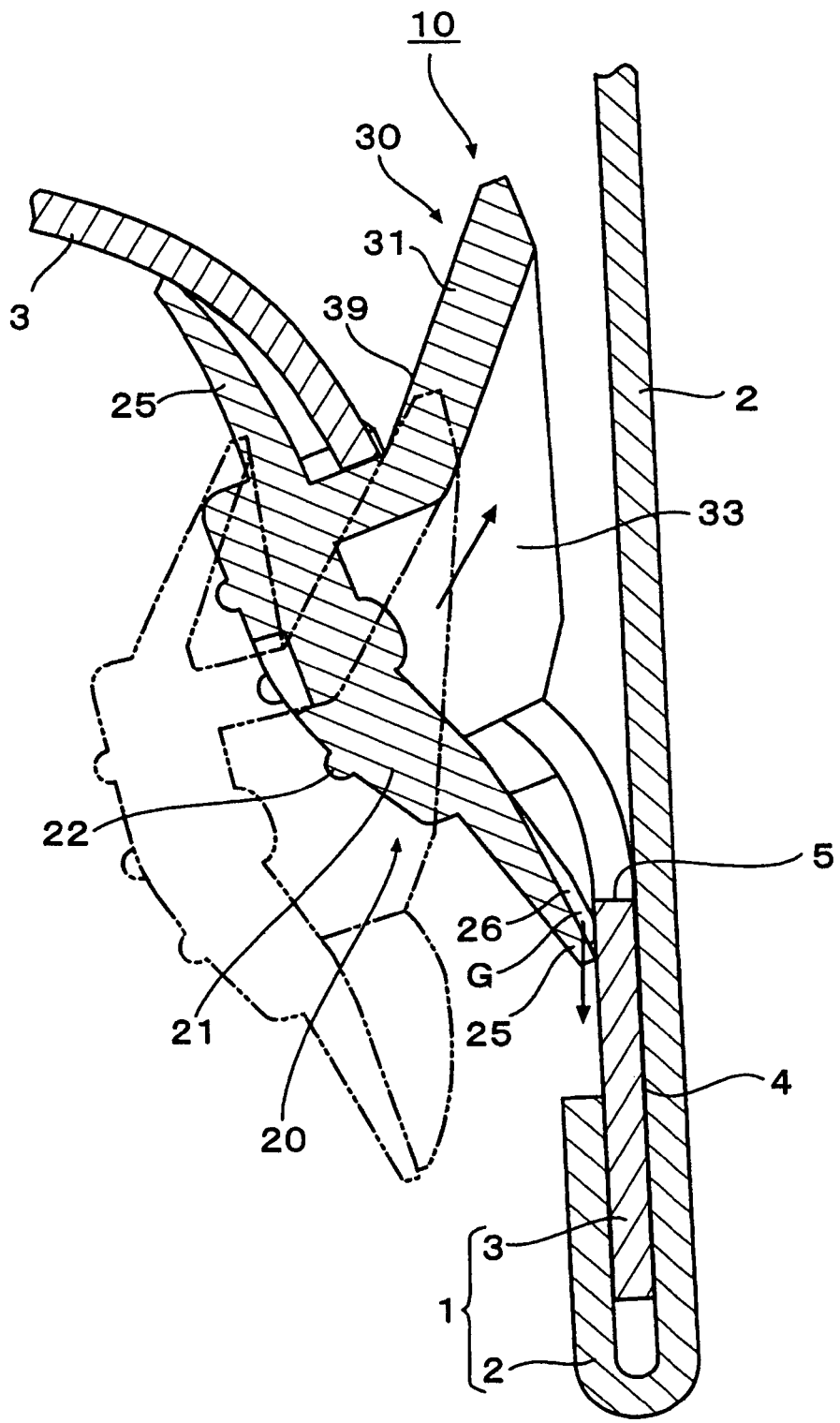
FIG. 4 is a sectional view illustrating a state that the drain plug is attached to a drain hole.
Figure 5:
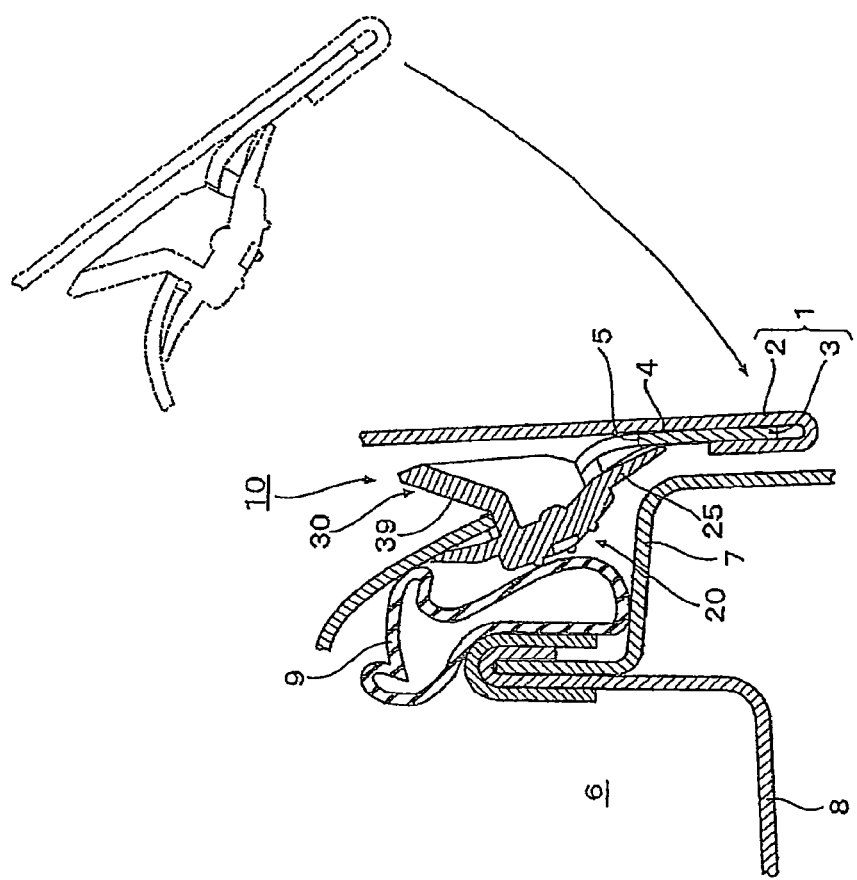
FIG. 5 illustrates a state of applying a body panel to which the drain plug is attached to an opening and closing lid.

As shown in FIGS. 4 and 5, the drain plug 10 is fitted to a drain hole 5 formed in an end edge part of a body panel 1 (such as a trunk lid, a door, a fender and the like) of a motor vehicle. The body panel 1 includes an outside panel 2 and an inside panel 3. In this embodiment, a trunk 6 is provided at a rear part of the motor vehicle, and as shown in FIG. 5, the body panel 1 is a lid attached to an opening part of the trunk 6 so as to be opened and closed. An end part of the outside panel 2 is formed into a U-shaped bent part, and an end part of the inside panel 3 is sandwiched between the U-shaped bent part. The end parts of both the panels 2 and 3 abut on each other, and the abutting parts are connected together by a spot welding process (see FIG. 4), for example. The inside panel 3 is bent in a prescribed form. In the body panel 1, a space between both the panels 2 and 3 is widened from a connecting part 4 toward a position apart therefrom. In this embodiment, the drain hole 5 is formed in a rectangular shape in the inside panel 3.

The above-described trunk 6 includes an outer part 7 having a prescribed bent form and an inner part 8 connected to the outer part 7. To a rear part of the connecting part of the outer part 7 and the inner part 8, a weather strip 9 is attached. As shown in FIG. 5, the body panel 1 (the lid) is to close the opening part of the trunk 6.

As shown in FIGS. 1A to 3B, the drain plug 10 is formed with a soft resin, such as rubber and elastic elastomer, and includes a head part 20 and an engaging leg 30 formed on one side of the head part 20. The head part 20 is to be arranged on a peripheral edge of the drain hole 5 so as to cover the drain hole 5 from a front side. The engaging leg 30 is to be inserted into the drain hole 5 so as to engage with the peripheral edge of the drain hole 5 from a back side.

The head part 20 includes a transversely-elongated thick part 21 and an umbrella-like thin flange part 25 extended from a peripheral edge of the thick part 21 so as to abut on the peripheral edge of the front side of the drain hole 5. A thickness of the thin flange part 25 is smaller than that of the thick part 21.

Figure 1A:
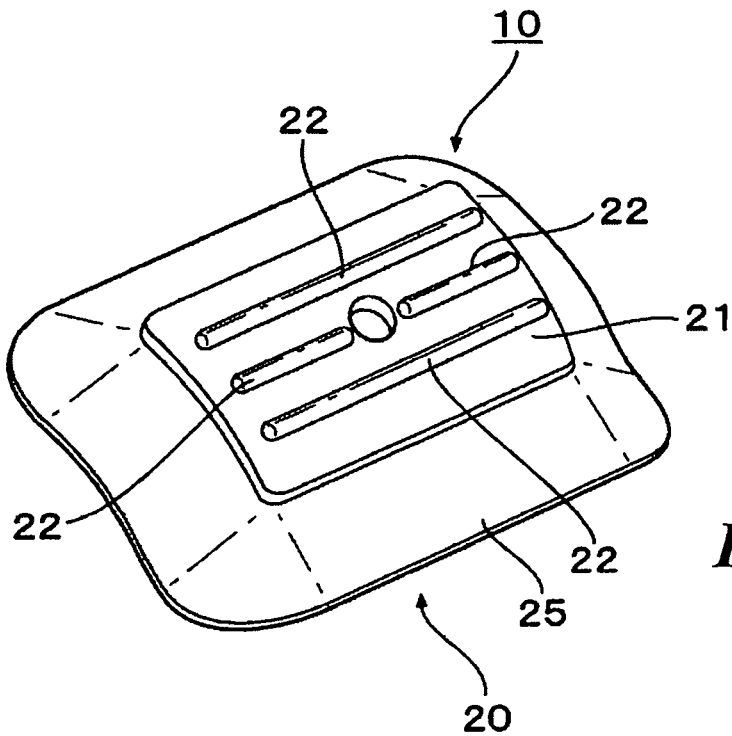
FIGS. 1A and 1B illustrate a drain plug according to an embodiment.
Figure 3A:
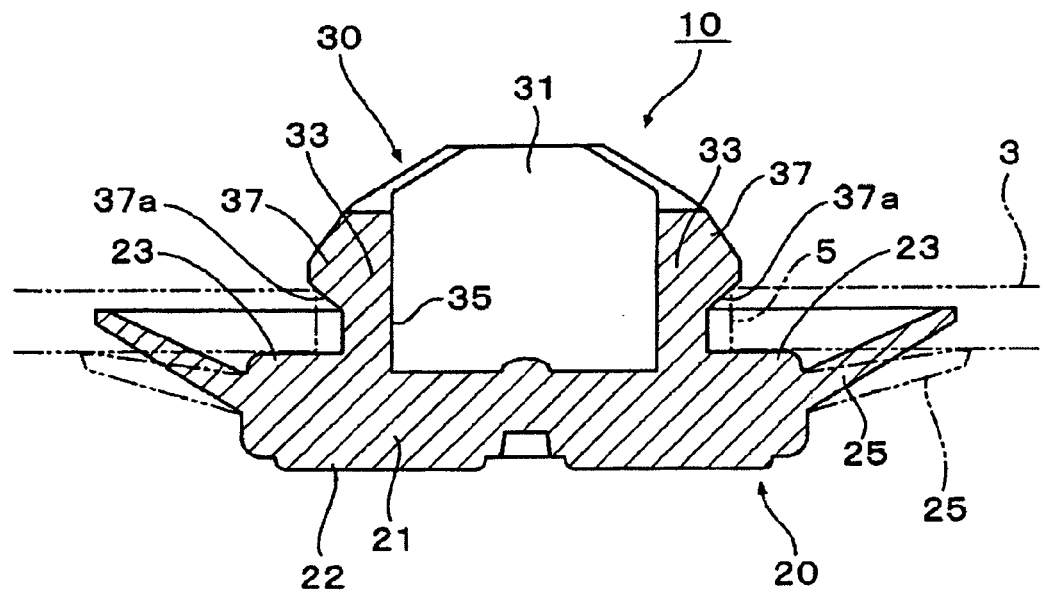
FIGS. 3A and 3B illustrate the drain plug.
Figure 3B:
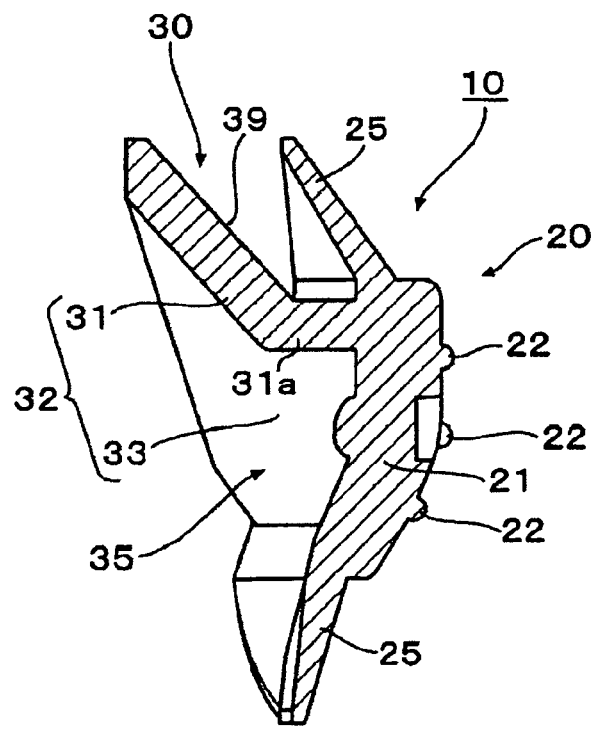

In the embodiment, as shown in FIG. 3B, in a sectional view, the thick part 21 is bent correspondingly to the bent form of the inside panel 3 toward a back surface side thereof from which the engaging leg 30 extends in a prescribed direction (referred to as an "extending direction of the engaging leg 30", hereinafter). Further, as shown in FIG. 1A, in a front surface side of the thick part 21, anti-skid protrusions 22 extending in a direction perpendicular to the extending direction of the engaging leg 30 are provided in parallel at prescribed intervals. The plural anti-skid protrusions 22 serve as non-slip members when the head part 20 is pressed to insert the drain plug 10 into the drain hole 5.

Figure 2A:
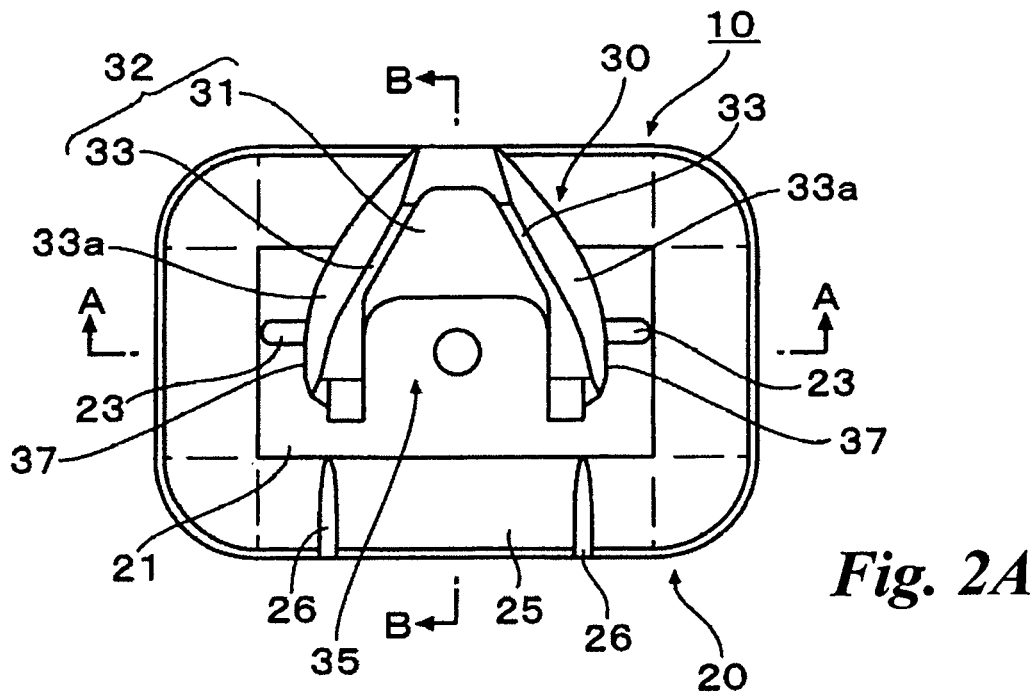
FIGS. 2A and 2B illustrate the drain plug.

As shown in FIG. 2A and FIG. 3A, on the back surface side of the thick part 21, pressing protrusions 23 and 23 are provided at positions facing a below-described pair of engaging parts 37 and 37 of the engaging leg 30 to abut on the peripheral edge of the front side of the drain hole 5. In this embodiment, the rib-like pressing protrusions 23 extend in the direction perpendicular to the extending direction of the engaging leg 30.

The thin flange part 25 is widened obliquely outward in an umbrella-like shape at a prescribed angle toward the back surface side from an outer peripheral edge of the thick part 21. The thin flange part 25 is bent correspondingly to the bent form of the inside panel 3 similarly to the above-described thick part 21. Further, the thin flange part 25 is thinner than the thick part 21 and its thickness is gradually smaller toward its end in an extending direction thereof (see FIG. 3B).

As shown in FIGS. 2A and 4, an opening part 35 is formed in a frame wall 32 of the engaging leg 30, and ribs 26 are provided on the back surface side of the thin flange part 25 at a rear part side (referred to as the "opening part 35 side", hereinafter) of the engaging leg 30. The ribs 26 are interposed between the peripheral edge of the front side of the drain hole 5 and the thin flange part 25 to thereby form a gap G (see FIG. 4) for draining water. In this embodiment, a pair of ribs 26 and 26 are provided on one side of the thin flange part 25 at the opening part 35 side, and are extended in parallel in an opposite direction to the extending direction of the engaging leg 30. Further, the ribs 26 are provided at both sides of the opening part 35.

Next, the engaging leg 30 will be described below. The engaging leg 30 includes the frame wall 32 formed of a front wall 31 and both side walls 33 and 33. The opening part 35 is formed in a rear part of the frame wall 32. An end part of the frame wall 32 is obliquely extended in a direction toward which the space between the panels 2 and 3 is widened from the end edge part of the body panel 1 while separating from the head part 20. On the other hand, the opening part 35 is opened in the frame wall 32 toward the end edge part of the body panel 1.

Figure 1B:
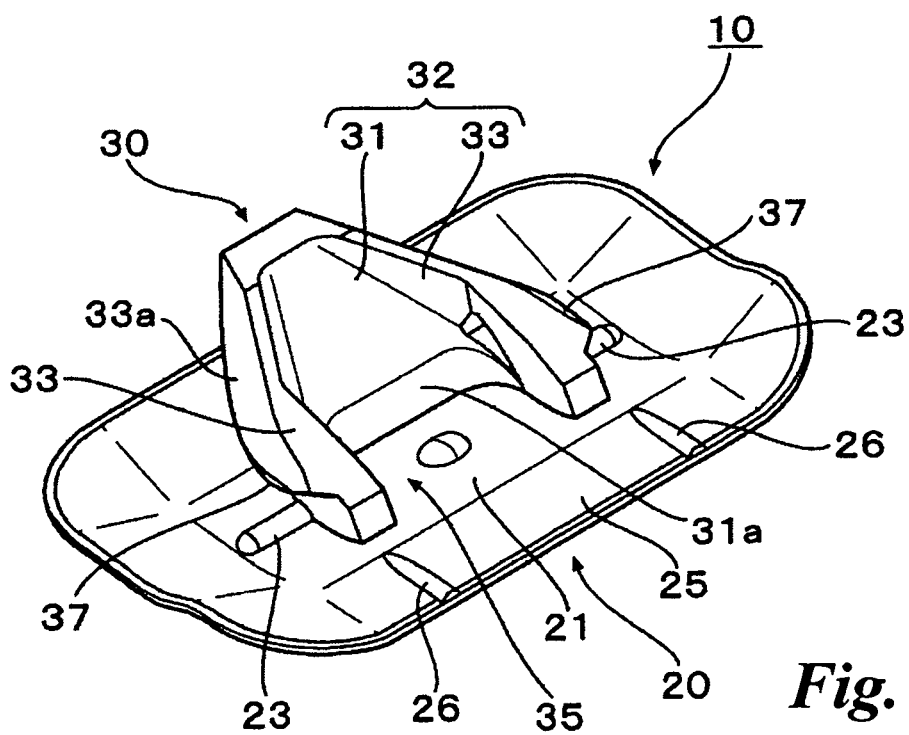

As shown in FIG. 1B and FIG. 3B, the front wall 31 has a part 31a. The part 31a vertically extends from the head part 20 with a prescribed width along the longitudinal direction of the thick part 21 and with a prescribed height from the back side of the thick part 21 (see FIG. 3B). The front wall 31 extends obliquely outward from the end part of the vertically provided part 31a to a front part (toward which the space between the panels 2 and 3 increases) and so as to separate from the head part 20, while being gradually reduced in a width (see FIGS. 2A and 2B).

Both the side walls 33 and 33 are connected to both side edge parts of the front wall 31 and include the part vertically extended from the back side of the thick part 21 and the part extending obliquely outward so as to separate from the head part 20.

Figure 2B:
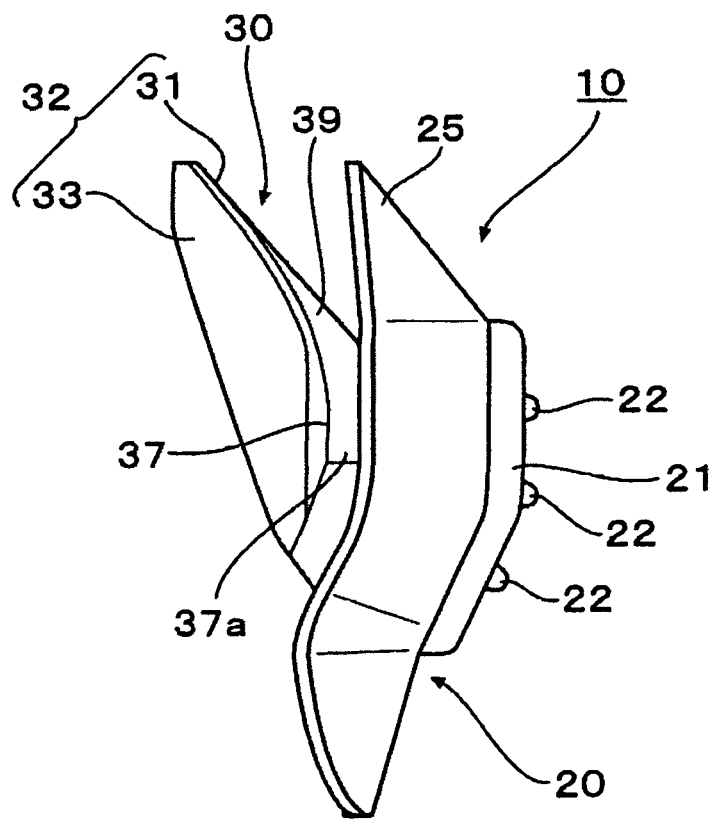

The front wall 31 and both the side walls 33 and 33 are extended, and the opening part 35 is formed in the rear part opposite to the extending direction of the engaging leg 30. As a result, when the drain plug 10 is viewed from the back surface side, the frame wall 32 has a substantially V-shape. The front wall 31 has the width gradually reduced toward an extending end as shown in FIG. 2A, and both the side walls 33 and 33 are formed to be gradually reduced in widths toward extending ends as shown in FIG. 2B and FIG. 3B. As a result, when the frame wall 32 is viewed from a side part, the frame wall 32 (the engaging leg 30) has a thin end (see FIG. 2B and FIG. 3B). And, when the frame wall 32 is viewed from a bottom surface side, the extending end thereof is also thin (see FIG. 2A).

In outer side surfaces of both the side walls 33 and 33, engaging parts 37 and 37 protruding with prescribed height are provided so as to be engaged with the peripheral edge of the drain hole 5 from the back side. On the engaging part 37, an engaging surface 37a (see FIG. 3A) facing the head part 20 is formed to be inclined at a prescribed angle.

In outer side edges of both the side walls 33 and 33 in the opposite side of the head part 20, tapered surfaces 33a and 33a are formed along the extending direction of the engaging leg 30 (see FIG. 2A). The tapered surfaces 33a are formed up to surfaces of the engaging parts 37 opposite to the head part (see FIG. 3A). Since the width of the end part in the protruding direction of the engaging leg 30 is narrowed by these tapered surfaces 33a and 33a, when the engaging leg 30 is inserted into the drain hole 5, the engaging leg 30 is prevented from being caught by the inner periphery of the drain hole 5 so that the engaging leg 30 may be smoothly inserted into the drain hole 5.

As shown in FIG. 2B, the surface of the front wall 31 facing the head part 20 forms a smoothly-continuous guide surface 39 without a stepped part, unlike to the engaging surfaces 37a of the engaging parts 37. When the engaging leg 30 is inserted into the drain hole 5 through the guide surface 39, the engaging parts 37 are guided to the peripheral edge of the back side of the drain hole 5. Even if stepped parts are formed between the guide surface 39 and the engaging surfaces 37a of the engaging parts 37, as long as heights of such stepped parts are sufficiently low so as to be rid over by the engaging leg 30 when the engaging leg 30 is inserted into the drain hole 5, it does not cause a problem.

Next, a method for using the above-described drain plug 10 will be described below.

Namely, the head part 20 of the drain plug 10 is gripped to align a direction of the extending end part of the engaging leg 30 with a direction in which the space between both panels 2 and 3 is widened and obliquely insert the end part of the engaging leg 30 into the drain hole 5 of the body panel 1. At this time, when the engaging leg 30 is viewed from a side surface and a bottom surface of the drain plug 10, the engaging leg 30 is formed with a tapered frame wall (see FIGS. 2A and 2B), and the engaging leg 30 can be easily inserted into the drain hole 5. Further, since both the sides of the extending part of the engaging leg 30 are provided with the tapered surfaces 33a and 33a, the engaging leg is prevented from being caught by the inner periphery of the drain hole 5.

After the end part of the engaging leg 30 is inserted into the drain hole 5 as described above, the engaging leg 30 is obliquely inserted into the drain hole along the guide surface 39 on the front wall 31 (see an imaginary line in FIG. 4). Thus, the guide surface 39 slides in contact with the inner periphery of the drain hole 5, the engaging leg 30 gradually enters between the panels 2 and 3. On the other hand, the engaging surfaces 37a continuous to the guide surface 39 are also guided, inserted into the drain hole 5 until passing therethrough and engaged with the peripheral edge of the drain hole 5 from the back side. In accordance therewith, the thin flange part 25 is bent and deformed correspondingly to the bent form of the inside panel 3 to elastically abut on the peripheral edge of the drain hole 5 from the front side. As a result, the peripheral edge of the drain hole 5 formed in the inside panel 3 are sandwiched between the thin flange part 25 and the engaging parts 37 from the front side and the back side, thereby fitting the drain plug 10 with the drain hole 5 (see FIG. 3B).

At this time, the pair of ribs 26 and 26 on the thin flange part 25 at the opposite side to the extending direction of the engaging leg 30 abut on the peripheral edge of the drain hole 5 from the front side, thereby forming the gap G for draining water between the peripheral edge of the front side of the drain hole 5 and the thin flange part 25 (see FIG. 4), and the pair of pressing protrusions 23 and 23 in the back side of the thick part 21 abut with the peripheral edge of the drain hole 5 from the front side (see FIG. 3A).

Then, in the drain plug 10, the end part of the frame wall of the engaging leg 30 is obliquely extended toward the direction in which the space between the panels 2 and 3 is widened from the end edge part of the body panel 1 and separating from the head part 20. Accordingly, as described above, since the engaging leg 30 can be obliquely inserted into the drain hole 5, as shown in FIG. 4, even when the drain hole 5 is provided around the end edge part of the body panel 1 and the space between the panels 2 and 3 is narrow, the drain plug 10 can be assuredly attached to the drain hole. As a result, the drain hole 5 can be formed more closely to the connecting part 4 of the panels 2 and 3 of the body panel 1 (see FIG. 4). Thus, water accumulated in the space between the panels 2 and 3 can be drained from the drain hole 5 in the frame wall 32 through the opening part 35, so as not to be left. Further, since the peripheral edge of the drain hole 5 is sealed by the thin flange part 25, the smell of exhaust gas can be effectively restrained from entering through the drain hole 5.

In this embodiment, since the ribs 26 are provided on the back surface side of the thin flange part 25 at the rear side of the engaging leg 30 to form the gap G for draining water, the water accumulated in the space between the panels 2 and 3 can be easily drained through the gap G. Further, since the ribs 26 are provided on the back side of the thin flange part 25, while ensuring the gap G for draining water, a space between the peripheral edge of the front side of the drain hole 5 and the thin flange, part 25 can be set to a minimum size so that the smell of exhaust gas can be effectively restrained from entering through the drain hole 5.

Since the engaging leg 30 includes the front wall 31 and both the side walls 33 and 33, for example, even when the drain plug 10 is formed with an elastic material such as rubber or elastomer, a sufficient rigidity can be ensured. Further, even when water enters inside the engaging leg 30, the water can be discharged from the opening part 35 formed in the frame wall 32 and drained from the gap G. Thus, the water is prevented from being accumulated inside the engaging leg 30.

In the drain plug 10, since the opening part 35 is provided in the rear part opposite to the extending direction of the engaging leg 30, when the engaging leg 30 is inserted into the direction in which the space between the panels 2 and 3 is widened, the opening part 35 is arranged in a part where the space between the panels 2 and 3 is narrow. Thus, the opening part 35 can be assuredly aligned in a direction (downward, in this embodiment) suitable for draining water.

In this embodiment, the head part 20 includes the thick part 21 and the thin flange part 25 extending in the umbrella-like shape. At the positions on the back side of the thick part 21 facing the engaging parts 37 of the engaging leg 30, the pair of pressing protrusions 23 and 23 are formed to abut on the peripheral edge of the drain hole 5 from the front side. Accordingly, the engaging leg 30 is inserted into the drain hole 5 so that the pressing protrusions 23 abut on the peripheral edge of the drain hole 5 from the front side, while the engaging parts 37 are engaged with the peripheral edge of drain hole 5 from the back side. The inside panel 3 is sandwiched by both the members at the drain hole 5, so that the drain plug 10 can be attached to the drain hole 5. At this time, since the pair of pressing protrusions 23 and 23 are formed in the thick part 21, a load during the attachment of the drain plug 10 is concentrated on the pressing protrusions 23 and 23 and the flexibility of the thin flange part 25 can be maintained. Thus, the thin flange part 25 can be flexibly deformed along the form of the inside panel 3 and allowed to come into close contact therewith.

In this embodiment, since the pair of rib-like pressing protrusions 23 and 23 are extended in the direction perpendicular to the extending direction of the engaging leg 30, the pressing protrusions 23 and 23 come into contact with the peripheral edge of the drain hole 5 from the front side. Thus, an angle of the head part 20 relative to the drain hole can be suitably changed with respect to the pressing protrusions 23 as supporting points, and the drain plug 10 can be attached by flexibly following the bent form of the inside panel 3. Even when the form of the inside panel 3 around the drain hole 5 is changed depending on the kind of a vehicle, the drain plug 10 may also be applicable thereto.

Figure 6:
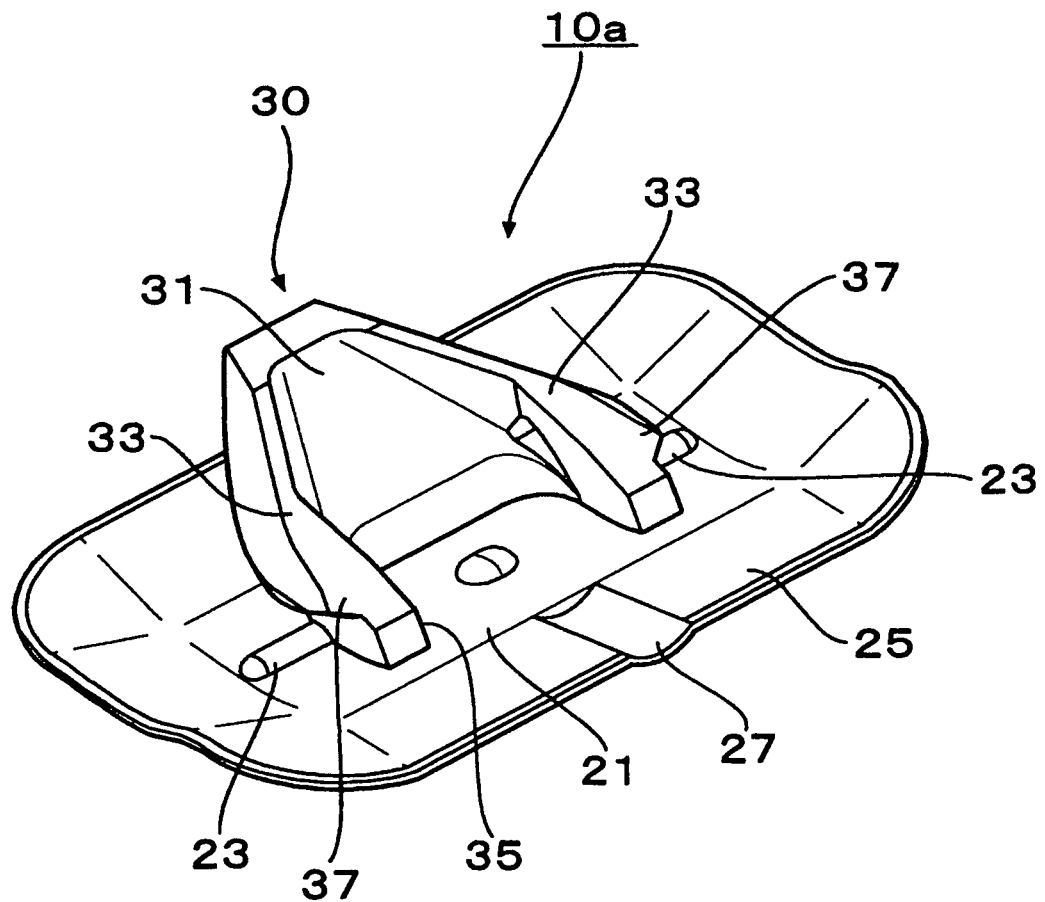
FIG. 6 is a perspective view illustrating another embodiment of the drain plug.

FIG. 6 shows a drain plug according to another embodiment. Parts substantially the same as those of the above-described embodiment are designated by the same reference numerals and an explanation thereof will be omitted.

In a drain plug 10a according to this embodiment, at an opening part 35 side of an engaging leg 30 on a back surface side of a thin flange part 25, a recess 27 is provided for forming a gap for draining water. In this embodiment, the recess is formed at a center of one side of the opening part 35 side on the thin flange part 25 along a direction opposite to the extending direction of the engaging leg 30.

Then, when the drain plug 10a is attached to a drain hole 5, a peripheral edge of the recess 27 of the thin flange part 25 abuts on the peripheral edge of the drain hole 5 from a front side, so as to assuredly drain water while suppressing the entrance of smell of exhaust gas.

What is claimed is:

1. A drain plug fitted to a drain hole formed in a body panel at an end edge part thereof, the body panel being formed of a pair of outside and inside panels, a space between the pair of panels being widened toward a prescribed direction from the end edge part, the drain plug comprising:
    a head part arranged on a peripheral edge of the drain hole from a front side, so as to cover the drain hole; and
    an engaging leg formed on a back surface of the head part, so as to be engaged with the peripheral edge of the drain hole from a back side by being inserted thereinto,
    wherein the engaging leg includes:
        a frame wall formed of a front wall and both side walls, so as to be extended in the prescribed direction while being separated from the head part;
        an opening part provided in a rear part of the frame wall, so as to face the end edge part of the body panel;
        engaging parts formed on both the side walls, so as to be engaged with the peripheral edge of the drain hole from the back side; and
        a guide surface formed on the front wall facing the head part, so as to guide the engaging parts to pass through the drain hole, and
    wherein the head part includes:
        a thick part having a first thickness;
        a thin flange part having a second thickness smaller than the first thickness and extending from a peripheral edge of the thick part, so as to elastically abut on the peripheral edge of the drain hole from the front side; and
        pressing protrusions formed on a back surface of the thick part at positions facing to the engaging parts on the engaging leg, so as to abut on the peripheral edge of the drain hole from the front side.

2. The drain plug of claim 1, wherein the pressing protrusions are formed into ribs extending in a direction perpendicular to the prescribed direction.

3. The drain plug of claim 1, wherein a rib or a recess is formed on a back surface of the thin flange part at an opposite side to the frame wall, so as to form a gap for draining water between the peripheral edge of the drain hole and the thin flange part.

4. A drain plug fitted to a drain hole formed in a body panel at an end edge part thereof, the body panel being formed of a pair of outside and inside panels, a space between the pair of panels being widened toward a prescribed direction from the end edge part, the drain plug comprising:
    a head part arranged on a peripheral edge of the drain hole from a front side, so as to cover the drain hole; and
    an engaging leg formed on a back surface of the head part, so as to be engaged with the peripheral edge of the drain hole from a back side by being inserted thereinto,
    wherein the engaging leg includes:
        a frame wall formed of a front wall and both side walls, so as to be extended in the prescribed direction while being separated from the head part;
        an opening part provided in a rear part of the frame wall, so as to face the end edge part of the body panel so as to drain between the head part and the body panel;
        engaging parts formed on both the side walls, so as to be engaged with the peripheral edge of the drain hole from the back side; and
        a guide surface formed on the front wall facing the head part, so as to guide the engaging parts to pass through the drain hole.

5. The drain plug of claim 4, wherein a width of the front wall decreases as the front wall extends away from the head part.

6. The drain plug of claim 4, wherein the head part further comprises pressing protrusions formed on a back surface of the head part at positions facing the engaging parts on the engaging leg, so as to abut on the peripheral edge of the drain hole from the front side.

7. The drain plug of claim 4, wherein a distance between the side walls decreases as the side walls extend away from the head part.

8. The drain plug of claim 4, wherein the guide surface is disposed between a distal end of the front wall and the engaging parts.

9. The drain plug of claim 4, wherein the side walls comprise a tapered surface formed along the prescribed direction of the engaging leg.

10. The drain plug of claim 4, wherein the opening part is provided in the rear part of the frame wall opposite the front wall.

11. The drain plug of claim 4, wherein the frame wall comprises a substantially V-shape.

12. The drain plug of claim 4, wherein the engaging parts each includes an engaging surface which engages with the peripheral edge of the drain hole, each engaging surface being continuous with the guide surface.

13. The drain plug of claim 4, wherein a portion of the head part includes a smooth transition between the side walls of the engaging leg to an area of the head part outside of the opening part.

14. The drain plug of claim 4, wherein a portion of the head part extending from inside the engaging leg to outside of the opening part is smooth.

15. The drain plug of claim 4, wherein a side of the head part opposite the engaging leg includes anti-skid protrusions.

* * * * *